US006845201B2

United States Patent
Kim et al.

(10) Patent No.: US 6,845,201 B2
(45) Date of Patent: Jan. 18, 2005

(54) POLED FIBER, A METHOD OF FABRICATING THE POLED FIBER, AND A DISPERSION COMPENSATOR

(75) Inventors: Jongbae Kim, Daejeon (KR); Sahnggi Park, Daejeon (KR); Yonggyu Choi, Daejeon (KR); Jungjin Ju, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 171 days.

(21) Appl. No.: 10/241,993

(22) Filed: Sep. 12, 2002

(65) Prior Publication Data

US 2003/0198447 A1 Oct. 23, 2003

(30) Foreign Application Priority Data

Apr. 17, 2002 (KR) .................................. 2002-0020903

(51) Int. Cl.[7] .............................................. G02B 6/02
(52) U.S. Cl. ...................................... 385/123; 359/240
(58) Field of Search ........................... 385/14, 122, 123

(56) References Cited

U.S. PATENT DOCUMENTS

| | | | | |
|---|---|---|---|---|
| 4,326,771 A | * | 4/1982 | Henry et al. ................... 385/92 |
| 5,617,499 A | * | 4/1997 | Brueck et al. ............... 385/122 |
| 5,768,462 A | * | 6/1998 | Monte ........................ 385/123 |
| 5,966,233 A | | 10/1999 | Fujiwara et al. |
| 6,041,149 A | * | 3/2000 | Monte ............................ 385/2 |
| 6,221,565 B1 | * | 4/2001 | Jain et al. .................... 430/321 |
| 6,259,830 B1 | * | 7/2001 | Bhagavatula ................... 385/2 |
| 6,654,520 B2 | * | 11/2003 | Choi et al. ..................... 358/37 |

OTHER PUBLICATIONS

SPIE vol. 2893, pp. 450–460.
Electronics Letters, Feb. 13, 1997, vol. 33, No. 4, pp. 318–319.
Optics Letters, vol. 24, No. 4, Feb. 15, 1999, pp. 208–210.
IEEE Photonics Technology Letters, vol. 12, No. 1, Jan. 1, 2000, pp. 82–84.

* cited by examiner

Primary Examiner—Phan T. H. Palmer
Assistant Examiner—Jennifer Doan
(74) Attorney, Agent, or Firm—Blakely Sokoloff Taylor & Zafman (57) ABSTRACT

A method of fabricating a poled fiber and a dispersion compensator. The method including patterning to cover an etching-resistant material on the body portions of the cladding and on one end or both ends of the optical fiber excluding the portions to be grooved in the longitudinal direction, etching the bare portions of the cladding excluding the portions covered with the etching-resistant material, evaporating electrodes on the etched portions and applying a voltage to the electrodes, and inducing periodic poling generating optical phenomenon of the second-order nonlinearity to the optical fiber through the patterned electrodes. The compensator including a periodic poled fiber to generate a phase conjugate wave of a difference frequency between a pump light and a signal light received from a fiber coupler, and a filter to pass the phase conjugate wave coming out from the periodic poled fiber.

3 Claims, 7 Drawing Sheets

POLED FIBER, A METHOD OF FABRICATING THE POLED FIBER, AND A DISPERSION COMPENSATOR

BACKGROUND OF THE INVENTION

1. Field of the Invention

The present invention is related to a poled fiber which uses the second-order optical nonlinearity, a method of fabricating the poled fiber, and a dispersion compensator which can compensate for the chromatic dispersion in a single mode fiber.

2. Description of the Related Art

Generally, the polarization P of a medium and the electric field E of applied light are related as follows:

$$P = \chi_{(1)}E + \chi_{(2)}EE + \chi_{(3)}EEE + \ldots$$

where $\chi_{(n)}$ denotes the coefficient of the n-th order polarizability. If $\chi_{(2)}$ is not equal to 0, the optical phenomenon of the second-order nonlinearity such as the second harmonic generation or the difference frequency generation is induced. In case of an optical fiber $\chi_{(2)}$ is equal to 0 because the silica glass used for the optical fiber is the material that possesses the property of centro-symmetry. However, if a static electrical field is applied to the fiber at a high temperature, the characteristic of the second-order nonlinearity is imposed to the fiber due to the poling effect breaking the centro-symmetry. The optical fiber fabricated in this way is called a poled fiber.

The magnitude of a nonlinear electro-optic coefficient induced to the core of an optical fiber by the poling is nearly exponentially and inversely proportional to the distance between a fiber core and a electrode. If the distance between the fiber core and the electrode changes from 10 mm to 5 mm, the nonlinear electro-optic coefficient induced to the core increases about 10 times or more. However, it is not desirable that the distance between the fiber core and the electrode is too close because of large loss of light propagating through the core in the poled fiber. Accordingly, it is recommended that holes or grooves are formed appropriately as close to the core of the fiber as possible within a depth range where the transmission loss is not degraded.

By the way, even if a large second-order nonlinear coefficient is induced to the optical fiber, a phase matching condition among the traveling waves must be satisfied in order to effectively generate substantial second-order optical phenomena. Since there exists dispersion also in the optical fiber where refractive index of light varies according to the wavelength, the phase matching condition is not satisfied among the light beams with different frequencies in general situation. In order to solve this problem, several techniques, for example a phase matching technique using birefringence of the optical fiber, have been proposed. But these techniques are very picky to satisfy the condition and the wavelength range allowed by the phase matching is extremely limited. Accordingly, active control of the phase matching condition is necessary to utilize the second-order nonlinearity at required wavelength, and for this, a method of quasi-phase matching was introduced.

Figure 13:
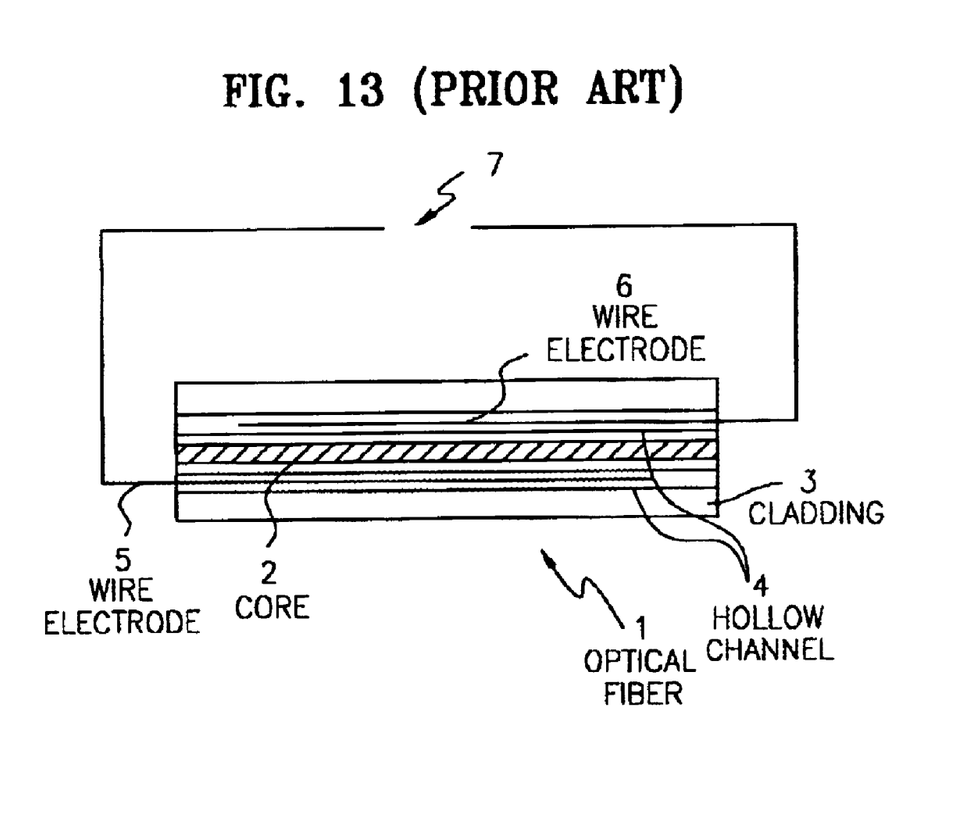
FIG. 13 is a block diagram illustrating the fabrication of poling for a conventional twin side hole optical fiber.

In U.S. Pat. No. 5,966,233 entitled "Inducing or Enhancing Electro-optic Properties in Optically Transmissive Material with Simultaneous UV Irradiation and Electric Field Application", published on Oct. 12, 1999, an optical fiber with twin side holes has been disclosed. The optical fiber 1 with twin side holes of FIG. 13 is drawn out by making two hollow holes 4 around the core 2 of a preform using a machine tool. Thereafter, long wire electrodes 5 and 6 are inserted into the two hollow holes 4 from the opposite directions, thereby forming plane poling. According to this invention, the optical fiber with twin side holes itself performs a role of insulator between wire electrodes. Thus, a high voltage can be applied even if the distance between electrodes is short, and a long poled fiber can be simply produced at low cost. However, no concrete technique capable of forming periodic poling has been developed yet.

Figure 14:
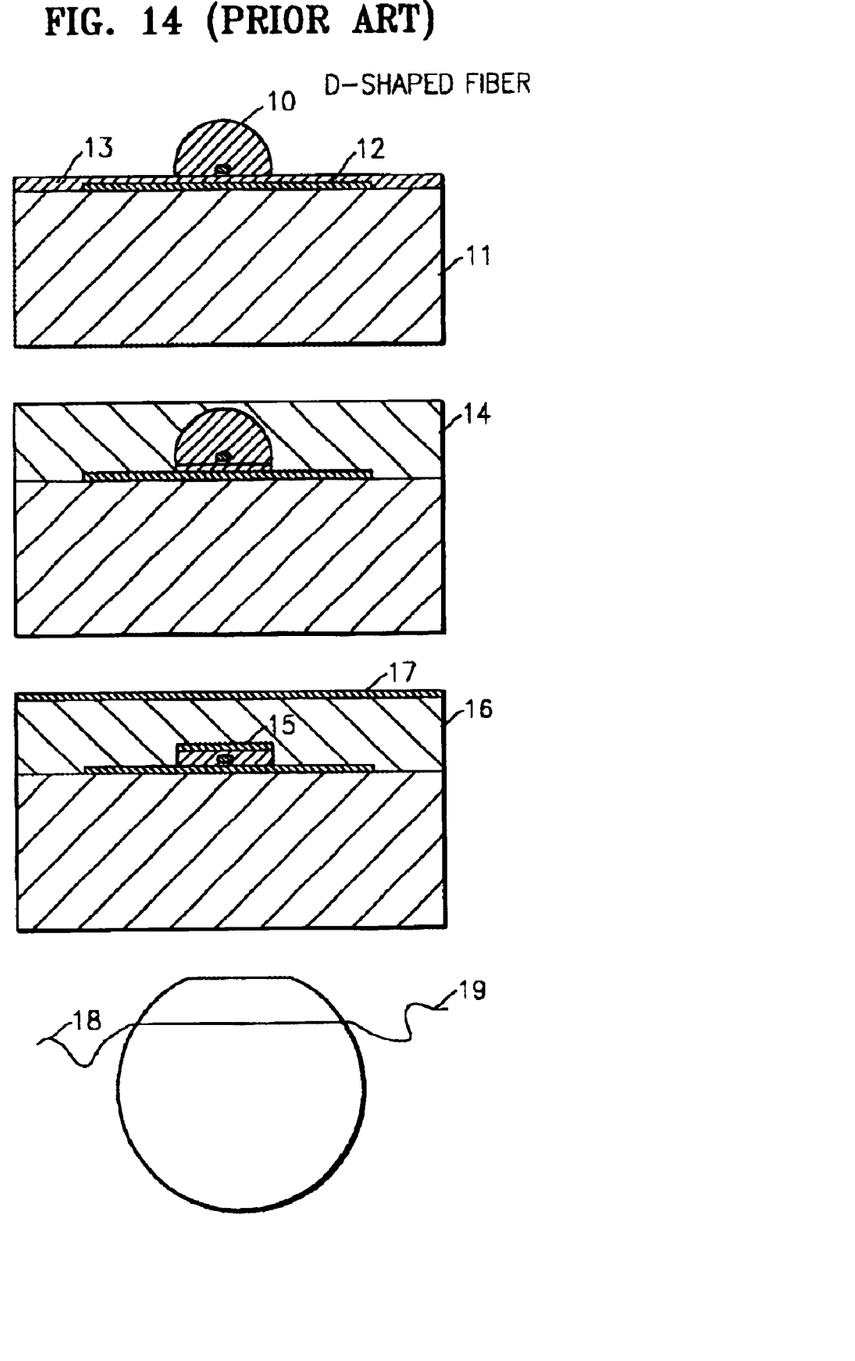
FIG. 14 is a block diagram illustrating the fabrication of poling for a conventional D-shaped optical fiber.

In U.S. Pat. No. 5,617,499 entitled "Technique for Fabrication of Poled Electro-optic Fiber Segment," published on Apr. 1, 1997, a D-shaped fiber has been disclosed. A D-shaped fiber 10 of FIG. 14 is used after drawing directly from a D-shaped perform, or polishing the side of a normal optical fiber mechanically to fabricate it into D-shape. After the D-shaped fiber 10 is glued to a substrate 11, a poled area is formed by way of a poling process of applying high voltage to the electrodes that are formed through a series of processes such as coating of the photoresist on the plane surface, removing the coated photoresist, masking, and evaporation of fine the electrodes. The above-mentioned technique of inducing the poling to a finite length of the D-shaped fiber is well known already. Such D-shaped fibers make it possible to provide elaborate formation of electrodes and poling, excellent reproducibility, and plane and periodic poling formation. However, the D-shaped fibers formed by mechanical polishing leads to a degradation in precision, and the processes of evaporation of a fine electrode pattern onto the flat sides of the fiber is more or less complicate. Also the distance between electrodes is relatively long and the wire electrodes are not reusable.

Meanwhile, a single mode fiber, which is a transmission path in an optical communication system, has limited transmission capacity and distance because of chromatic dispersion. The chromatic dispersion of an optical fiber represents change of the refractive index of a medium according to the wavelength of light. As the refractive index of a medium determines the velocity of traveling light, the velocity difference depending on the wavelength of light increases in an optical fiber with large chromatic dispersion. If the bit velocity of an optical signal in each channel increases, the linewidth of the wavelength of the corresponding signal increases. Then component of the signal is dispersed on the time axis by chromatic dispersion, and accordingly the bit velocity for transmission is limited. In general, a single mode fiber to be used as a transmission path for optical communication has negative chromatic dispersion at 1.5 $\mu$m wavelength range in which is power loss is minimal. This implies that a portion of the optical signal with a long wavelength travels more slowly than a portion with a short wavelength. That is, in case an optical signal with a finite magnitude of wavelength linewidth travels through a single mode fiber, a portion of the optical signal with a short wavelength is temporally placed in the front part of the pulse while a portion with a long wavelength is temporally placed in the rear part of the pulse. Such chromatic dispersion is the problem to be solved in optical transmission of large capacity.

In a method of dispersion compensation by mid-span spectral inversion, a dispersion compensator is inserted in the center of an optical transmission path. Generally, if pump light with a frequency of $\omega_p$ and signal light with a frequency of $\omega_s$ are incident on a medium with the second-order nonlinear effect through an optical fiber coupler, light with a frequency of $(\omega_p - \omega_s)$ can be generated according to the phase matching condition. The generated light with a frequency of $\omega_i$ ($\omega_i = \omega_p - \omega_s$) is a phase-conjugated wave that has a complex conjugate relationship with the signal light of a frequency $\omega_s$. Such a phase conjugate wave of spectral inversion has the characteristic that can compensate for the phase distortion of incident light experienced on the transmission path. That is, if we see before and after the mid-span spectral inversion, since a short wavelength of the signal light is phase-inverted to a long wavelength of the generated light and vice versa, the chromatic dispersion experienced in the first half part is symmetrically compensated if the generated light again travels through the remaining half part of the transmission path.

Figure 11:
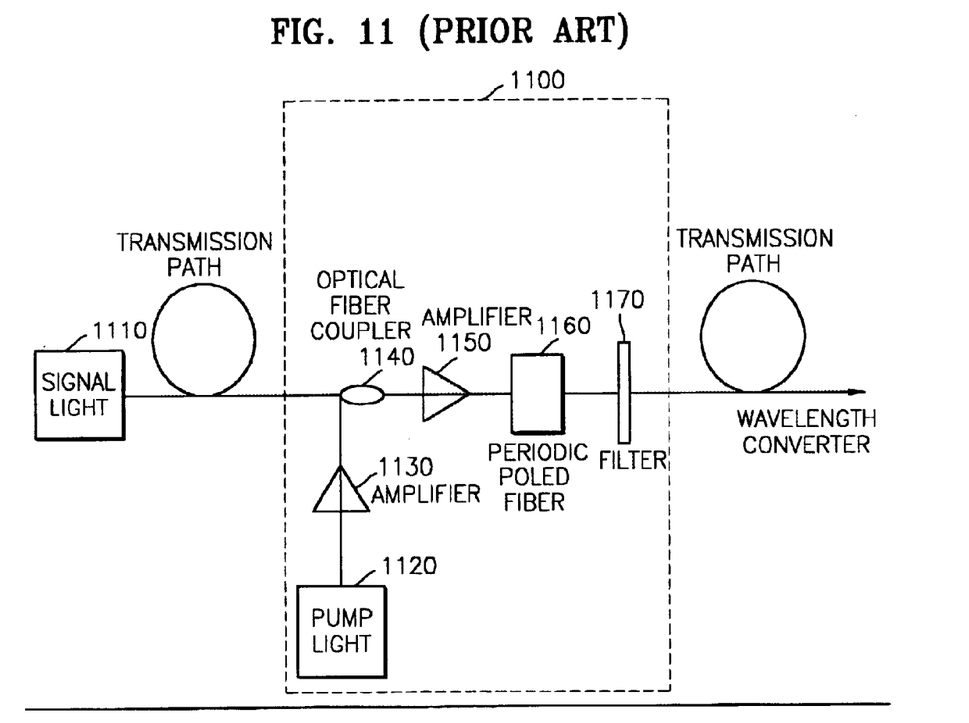
FIG. 11 is a block diagram of a conventional dispersion compensator.

In Korean Patent Publication No. 2001-11093, entitled "Chromatic Dispersion Compensator Using Poled Fibers," published on Feb. 15, 2001, a chromatic dispersion compensator using a poled fiber has been disclosed. The chromatic dispersion compensator is shown in FIG. 11. A dispersion compensator 1100 of FIG. 11 includes a periodic poled fiber 1160, amplifiers 1130 and 1150, an optical fiber coupler 1140, and a filter 1170. The pole fiber 1160 is placed at the center of a transmission region. If the frequency $\omega_p$ of pump light is similar to the frequency $\omega_s$ of signal light used for communications, that is, if $\omega_p \cong \omega_s$, the dispersion compensator 1100 in FIG. 11 can be used. The signal light dispersed while traveling through a transmission path is coupled at the optical fiber coupler 1140 along with pump light amplified by the amplifier 1130, and is put into the periodic poled fiber 1160 via the amplifier 1150. The periodic poled fiber 1160 generates a second-order harmonic wave with $2\omega_p$ from the phenomenon of the second harmonic generation of the pump light ($2\omega_p = \omega_p + \omega_p$), which corresponds to ½ the wavelength of the pump light. Then it at the same time converts the second-order harmonic wave, which is due to the phenomenon of the differential frequency generation ($\omega_i = 2\omega_p - \omega_s$) between the second-order harmonic wave and the signal light, into a phase conjugate wave of which the dispersion can be compensated. Only the idler wave ($\omega_i$) that is mid-span spectrally inverted at the periodic poled fiber passes through the filter 1170. The output wave from the filter 1170 travels along the transmission path. However, the chromatic dispersion compensator disclosed in Korean Patent Publication No. 2001-11093 can only be used in case of the signal and the pump lights with similar wavelengths, and cannot be practically used in case the wavelength of pump light is ½ of signal light.

SUMMARY OF THE INVENTION

It is the object of the present invention to provide a poled fiber of almost no splicing loss with other typical fibers due to easy splicing, a method of fabricating the poled fiber with a high electro-optic coefficient induced by controlling the distance between electrodes around the core in use of a typical fiber instead of a special fiber, and a dispersion compensator capable of effectively compensating for the chromatic dispersion of a single mode fiber even if the wavelength of pump light is around ½ of signal light.

BRIEF DESCRIPTION OF THE DRAWINGS

The above object and advantages of the present invention will become more apparent by describing preferred embodiments in detail thereof with references to the attached drawings in which.

DETAILED DESCRIPTION OF THE INVENTION

In each of FIGS. 1 through 4, (a) is a front view from the direction to which an etching material is projected so as to form a groove on the optical fibre, (b) is a side view from the direction of a grooved optical fibre, and (c) is a cross-section of an optical fibre.

Figure 1:
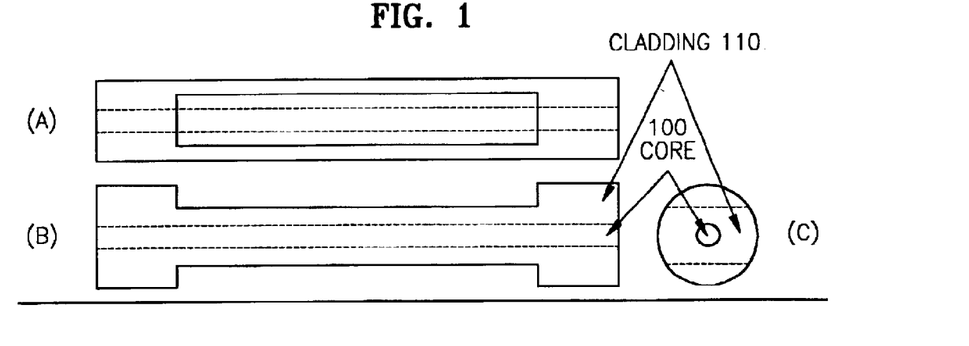
FIG. 1 is a schematic view of an optical fiber according to the first embodiment of the present invention.

Referring to FIG. 1, grooves are formed on the opposite sides along the longitudinal direction of the optical fibre while parts of both ends of the optical fibre keep the original core-cladding structure.

Figure 2:
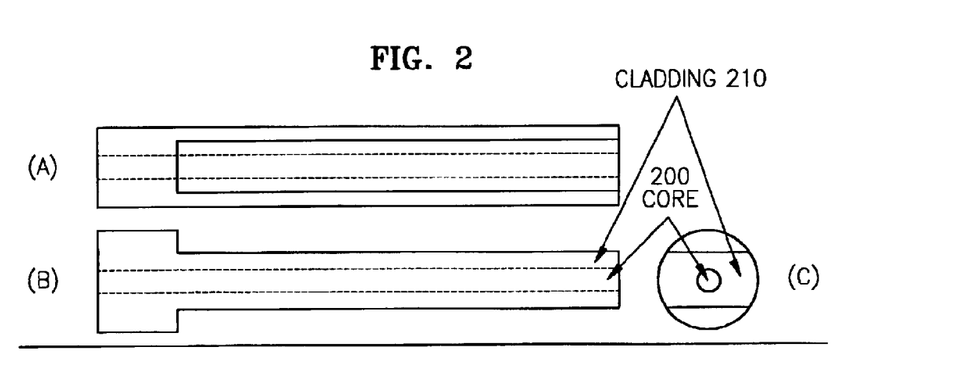
FIG. 2 is a schematic view of an optical fiber according to the second embodiment of the present invention.

Referring to FIG. 2, grooves are formed on the opposite sides along the longitudinal direction of the optical fibre while only one end part of the optical fibre keeps the original core-cladding structure.

Figure 3:
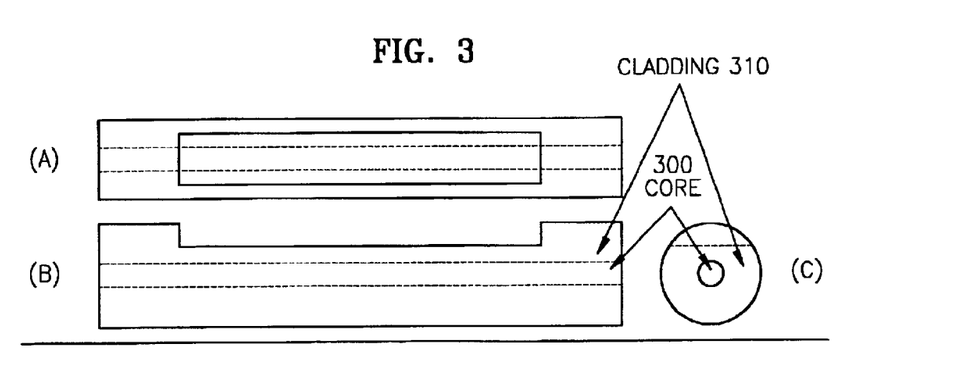
FIG. 3 is a schematic view of an optical fiber according to the third embodiment of the present invention.

Referring to FIG. 3, a groove is formed on one side along the longitudinal direction of the optical fibre while parts of both ends of the optical fibre keep the original core-cladding structure.

Figure 4:
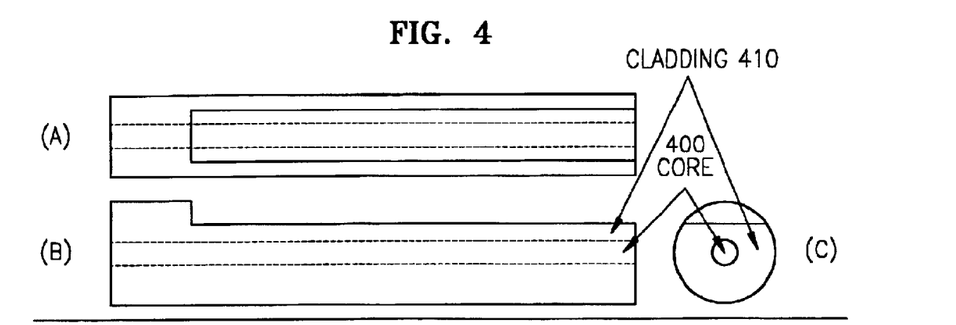
FIG. 4 is a schematic view of an optical fiber according to the fourth embodiment of the present invention.

Referring to FIG. 4, a groove is formed on one side along the longitudinal direction of the optical fibre while only one end part of the optical fibre keeps the original core-cladding structure.

As described above, by keeping the original core-cladding structure of a typical optical fibre at one end or both, splicing with other fibers can be done easily with almost no splicing loss.

In the optical fibres shown in FIGS. 1 through 4, one side or both sides keep the original core-cladding structure, while one side or both sides of the middle portion of a cladding are plane surfaces close to the core, that is, grooves. The optical fibre to be grooved can be any of a single mode fibre, a multi mode fibre, or a special fibre (or an optical waveguide) as long as they have core-cladding structure.

In the front view (a) and side view (b) of FIG. 1, a portion defined by a dotted line indicates a core 100, and a portion defined by a solid line indicates a cladding 110. As shown in FIGS. 1 through 4, while one end or both ends of an optical fibre keep core-cladding structure, one side or both sides of the cladding is physically or chemically processed and cut parallel to a diameter of the core to thereby turn into a plane surface. The plane groove contacts an electrode and can be fabricated into a desired shape by appropriately controlling the distance between the core and the electrode. In this way the poling is maximized but power loss of travelling wave is minimized. Undoubtedly, the groove may be slightly uneven if seen from the side view (b), or may be slightly deformed, for example, to be polygonal or elliptical, if seen from the front view (a).

Figure 5:
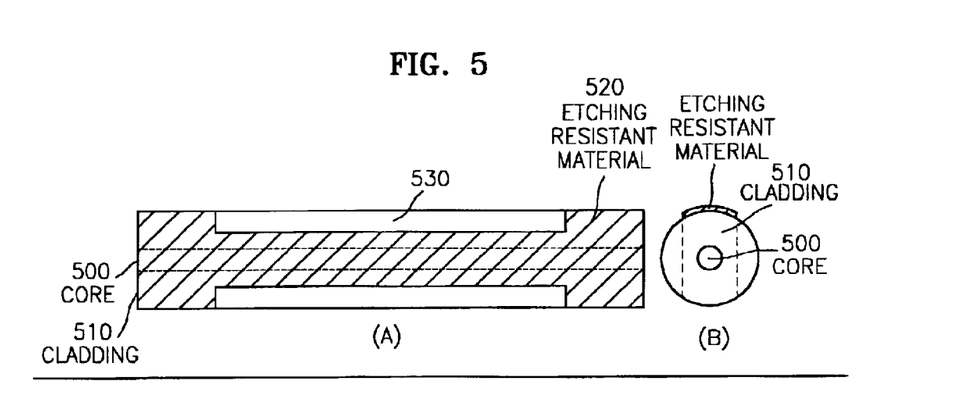
FIG. 5 shows the first step to fabricate a poled fiber from the optical fiber of FIG. 1.
Figure 6:
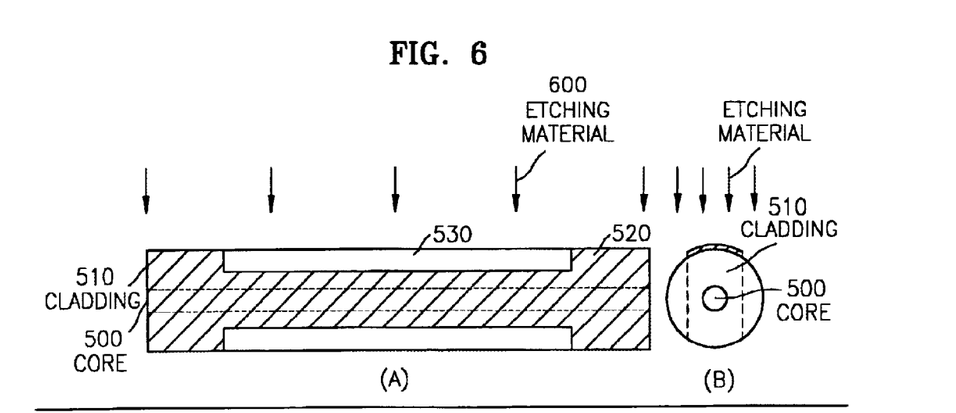
FIG. 6 shows a dry-etching method used for the second step to fabricate a poled fiber from the optical fiber of FIG. 1.
Figure 7:
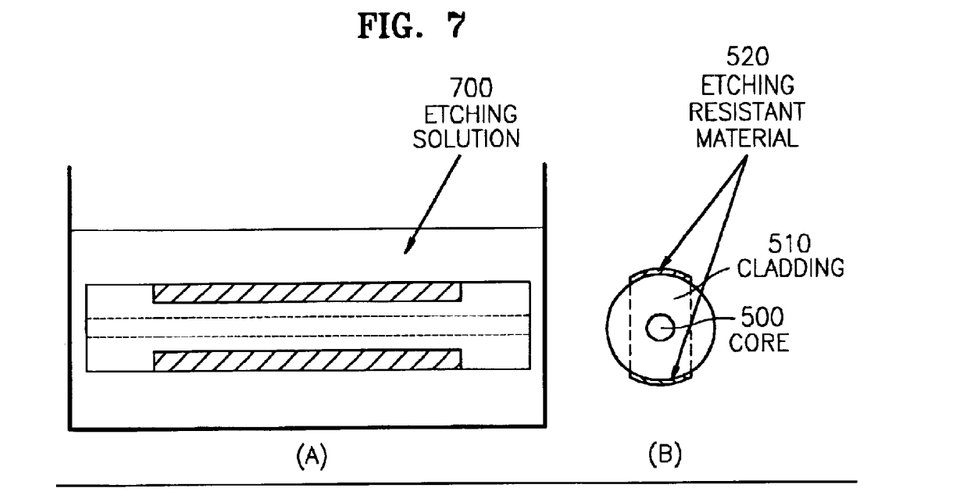
FIG. 7 shows another wet-etching method used for the second step a to fabricate poled fiber from the optical fiber of FIG. 1.

FIGS. 5 through 9 illustrate processes for fabricating a poled fibre from the optical fibre of FIG. 1. Referring to FIG. 5, in case etching is performed as the first step, a portion 530 to be cut by the etching material is exposed. But both end portions of an optical fibre and part of the middle portion not to be deformed are covered with an etching-resistant material 520 which is endurable against etching process by the material projected from an external source. FIG. 5 (a) is a front view of an optical fibre seen from the direction to which an etching is projected, and FIG. 5 (b) is a cross-section of the optical fibre. Referring to FIG. 6, in case dry etching is performed as the second step, an etching material 600 is projected on to the direction of an etching-resistant material. That is, the surface of the optical fibre covered with the etching-resistant material is exposed in the perpendicular direction to which the etching material is projected. Referring to FIG. 7, in case wet etching is performed as another method of the second step, an optical fibre covered with the patterning of the etching-resistant material 520 is put into an etching solution 700. Then, the bare surface uncovered with the etching-resistant material 520 is exposed to the solution to be etched.

Figure 8:
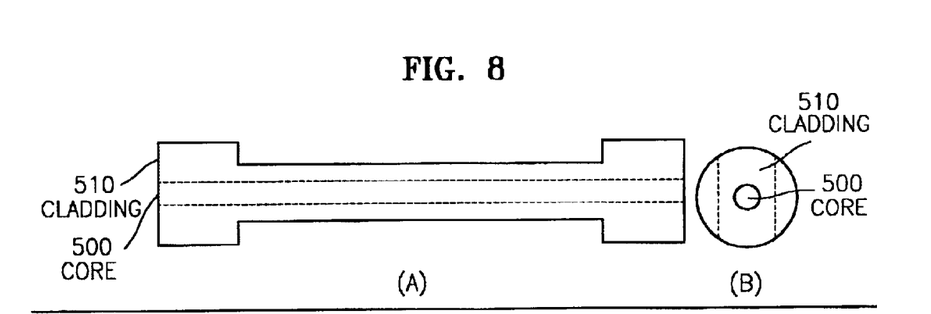
FIG. 8 shows the third step to fabricate a poled fiber from the optical fiber of FIG. 1.

In the third step, as shown in FIG. 8, the portion of the optical fibre covered with the etching-resistant material remains as it is, while the uncovered portion 530 is cut off by the projected etching material 600. It can be seen from the side view (b) of FIG. 8 that both sides of the optical fibre have been cut off. That is, a portion of the optical fibre is covered with an etching-resistant material endurable against etching, while remaining portion, which is not covered with the etching-resistant material, is exposed and cut off to make plane surfaces at both sides. At this time, the etching-resistant material is removed.

Figure 9:
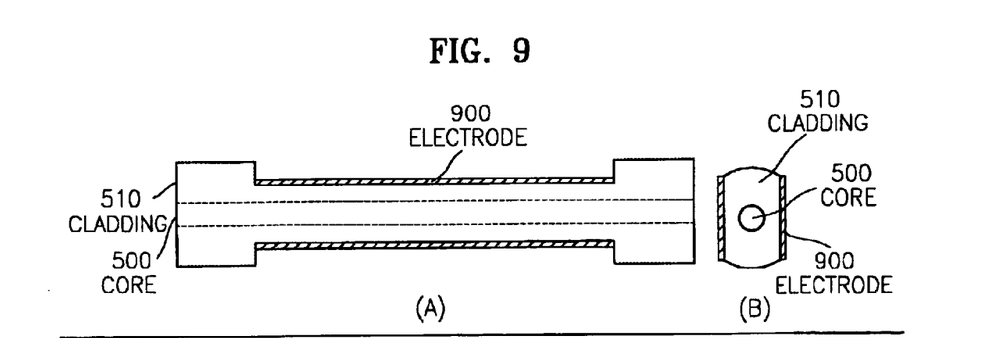
FIG. 9 shows the fourth step to fabricate a poled fiber from the optical fiber of FIG. 1.

In the fourth step, as shown in FIG. 9, electrodes 900 are evaporated on the portion 530 which has been cut off from the fiber by the etching materials. It can be seen from the side view (b) of FIG. 9 that electrodes are evaporated on the plane sides by deposition. Of course, here a typical electrode can be evaporated to form a plain poling, or a grooved electrode with finite intervals can be evaporated to form a periodic poling.

Figure 10:
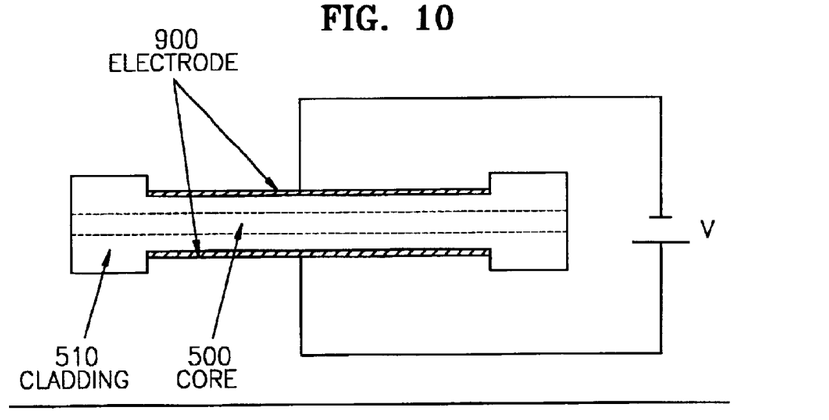
FIG. 10 is a schematic view illustrating the fabrication of poling for the optical fiber of FIG. 1.

FIG. 10 is a schematic view illustrating the formation of poling to the optical fiber on which the electrodes are evaporated as in FIG. 9. The electrodes 900, which are disposed on both sides of the optical fiber in the longitudinal direction, are in contact with the grooved portion closest to the fiber core 500 and arranged to the opposing directions. The process for inducing poling is the same as the conventional poling process. That is, while a constant temperature is maintained, a voltage is applied to the electrodes 900 for a finite time in vacuum state, in the air, or in a specific gaseous atmosphere and thereafter cooled down slow with the voltage applied. At this time, a radiation method of ultraviolet laser can be adopted.

Figure 12:
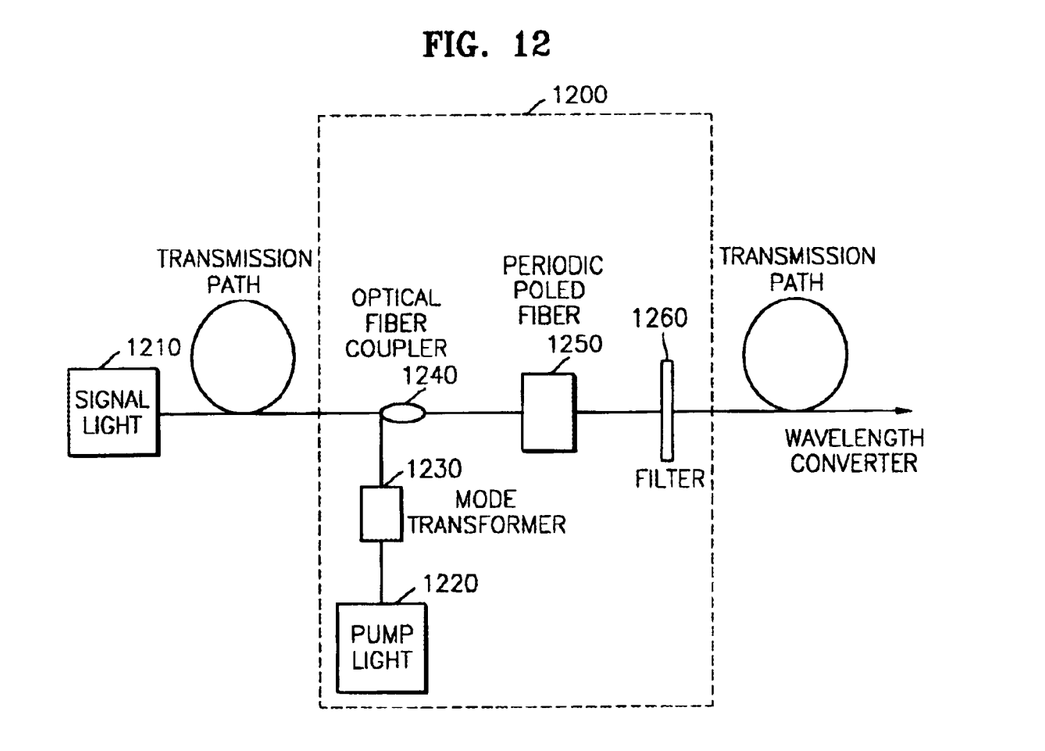
FIG. 12 is a block diagram of a dispersion compensator according to a preferred embodiment of the present invention.

FIG. 12 is a block diagram illustrating an example of dispersion compensator using a periodic poled fiber according to the present invention. A dispersion compensator 1200 of FIG. 12 includes a periodic poled fiber 1250 which is located at the center of a transmission path, a mode converter 1230, a pump light source 1220, an optical fiber coupler 1240, and a filter 1260.

The dispersion compensator 1200 above can be adopted in case the wavelength of pump light is ½ or around of signal light ($\omega_p \cong 2\omega_s$). Since the wavelength of pump light is as short as about ½ of signal light, the pump light exists as multi modes in an optical fibre where signal light exists as a single mode. Accordingly, the mode converter 1230 converts the multi modes from the pump light source 1220 into a single mode. The optical fibre coupler 1240 couples the signal light and the output of the pump light from the mode converter 1230. The coupled lights are put into the periodic poled fibre 1250. At the periodic poled fiber (1250) a new light wave, which is phase conjugated at the similar wavelength range, is generated due to the phenomenon of difference frequency generation ($\omega_i = \omega_p - \omega_s \cong \omega_s$). The phase conjugate wave travels along the transmission path through the filter 1260 which only passes the phase conjugate wave.

In the structure of a poled fibre according to the present invention, since its one end or both ends keep the core-cladding structure of a general optical fibre, the poled fibre is easily spliced with other typical fibres with little splicing loss. In the fabrication method of a poled fibre according to the present invention, since the distance between electrodes around the core can be appropriately controlled, a high electro-optic coefficient can be induced to the poled fibre. Also, according to a dispersion compensator according to the present invention, the chromatic dispersion of a single-mode fibre can be effectively compensated in case the wavelength of pump light is ½ of signal light.

What is claimed is:

1. A method of fabricating a poled fiber, the method comprising:

patterning to cover an etching-resistant material on the body portions of the cladding and on one end or both ends of the optical fiber excluding the portions to be grooved in the longitudinal direction;

etching the bare portions of the cladding excluding the portions covered with the etching-resistant material;

evaporating electrodes on the etched portions; and applying a voltage to the electrodes; and inducing periodic poling generating optical phenomenon of the second-order nonlinearity to the optical fiber through the patterned electrodes.

2. A dispersion compensator including:

the poled fiber fabricated in the method of claim 1.

3. A dispersion compensator comprising:

a pump source to generate light of a wavelength about ½ of signal light;

a mode converter to transform a multiple mode of output from the pump light source into a single mode;

a fiber coupler to couple the signal light received through a transmission path and the output of the pump light from the mode converter; and a periodic poled fiber to generate a phase conjugate wave of a difference frequency between the pump light and the signal light received from the fiber coupler; and a filter to pass the phase conjugate wave coming out from the periodic poled fiber.

* * * * *